(12) United States Patent
Manabe et al.

(10) Patent No.: US 8,655,025 B2
(45) Date of Patent: Feb. 18, 2014

(54) DATA ANALYSIS DEVICE, DATA ANALYSIS METHOD, AND PROGRAM

(75) Inventors: Shizuo Manabe, Nishinomiya (JP); Ikuo Kitagawa, Sakai (JP)

(73) Assignee: Pasco Corporation, Tokyo (JP)

( * ) Notice: Subject to any disclaimer, the term of this patent is extended or adjusted under 35 U.S.C. 154(b) by 84 days.

(21) Appl. No.: 13/358,809

(22) Filed: Jan. 26, 2012

(65) Prior Publication Data

US 2012/0128207 A1 May 24, 2012

(30) Foreign Application Priority Data

Aug. 11, 2010 (JP) ................................. 2010-180529

(51) Int. Cl.
*G06K 9/00* (2006.01)
(52) U.S. Cl.
USPC .......................................... 382/106; 382/154
(58) Field of Classification Search
USPC ................................................ 382/106, 154
See application file for complete search history.

(56) References Cited

U.S. PATENT DOCUMENTS

2010/0034426 A1* 2/2010 Takiguchi et al. ............ 382/106
2010/0208981 A1* 8/2010 Minear et al. ................. 382/154

FOREIGN PATENT DOCUMENTS

JP  A-2009-204615  9/2009
WO  WO 2009/143986 A1  12/2009

OTHER PUBLICATIONS

May 29, 2012 Extended European Search Report issued in European Patent Application No. 12153046.3.
William K. Pratt, "Digital Image Processing", *Image Segmentation*. ,Wiley-Interscience, Hoboken, New Jersey, XP002675193, Jan. 1, 2007, pp. 598-600.

* cited by examiner

*Primary Examiner* — Anand Bhatnagar
*Assistant Examiner* — Soo Park
(74) *Attorney, Agent, or Firm* — Oliff PLC

(57) ABSTRACT

Provided is a data analysis device for automatically detecting a step on the ground based on point cloud data representing a three-dimensional shape of a feature surface. A space subject to analysis is divided into a plurality of subspaces. A boundary search unit (22) searches for a boundary formed by the step on a horizontal plane for each of the subspaces. The boundary search unit (22) searches for a step neighborhood area having a predetermined width, in which the points projected on the horizontal plane are accumulated equal to or more than a criterion set in advance and a cloud of the points have a difference in height equal to or more than a step threshold set in advance, and searches for a directional line along a distribution of the cloud of points belonging to the step neighborhood area on the horizontal plane as the boundary.

8 Claims, 10 Drawing Sheets

DATA ANALYSIS DEVICE, DATA ANALYSIS METHOD, AND PROGRAM

BACKGROUND OF THE INVENTION

1. Field of the Invention

The present invention relates to a data analysis device, a data analysis method, and a program for detecting a step on the ground based on point cloud data representing a three-dimensional shape of a feature on the Earth's surface.

2. Description of the Related Art

Japanese Patent Application Laid-open No. 2009-204615 discloses a technology for acquiring three-dimensional point cloud data representing a shape of a feature on the Earth's surface using a laser scanner. For example, in a mobile mapping system, a laser scanner is installed on a motor vehicle, and a laser is radiated obliquely downward from a top of the vehicle body. The direction of radiating the laser is swung widthwise, and a laser pulse is emitted for each small angle across a scan angle range. A distance is measured based on a period from the emission of the laser to reception of reflected light, and the direction of the emission of the laser, the time, the position and attitude of the vehicle body, and the like are measured at this time. Then, point cloud data representing three-dimensional coordinates of a point which reflects the laser pulse is acquired from the measured data.

Moreover, video is taken using a camera simultaneously with the acquisition of the point cloud data. The image can be used by a user to specify a part to be measured in a data analysis.

SUMMARY OF THE INVENTION

A feature conventionally needs to be manually determined based on the point cloud data, and the feature is manually extracted using a three-dimensional CAD editing tool or the like.

The present invention has been made in view of the above-mentioned problem, and therefore has an object to provide a data analysis device, a data analysis method, and a program for automatically detecting a step on the ground based on point cloud data representing a three-dimensional shape of a feature on the Earth's surface.

According to an aspect of the present invention, there is provided a data analysis device for detecting a step on the ground based on data of a cloud of points representing a three-dimensional shape of a feature surface in a target space subject to analysis, including: subspace setting means for dividing the target space into a plurality of subspaces, and setting the plurality of subspaces respectively as unit spaces to be analyzed; and boundary search means for searching for a boundary formed by the step on a horizontal plane for each of the unit spaces, in which the boundary search means searches the horizontal plane for a step neighborhood area which has a predetermined width and in which the points projected on the horizontal plane accumulated up to or more than a criteria set in advance and a cloud of the points have a difference in height equal to or more than a step threshold set in advance, and searches for a directional line along a distribution of the cloud of points belonging to the step neighborhood area on the horizontal plane as the boundary.

According to another aspect of the present invention, the data analysis device further includes boundary tracking means for tracking the boundary detected in the subspace outside the subspace, and in the data analysis device: the boundary tracking means sets, when the boundary is detected in the unit space, a new unit space neighboring the unit space, as a tracking space in a direction of an extension line of the directional line corresponding to the boundary; and the boundary search means searches for a boundary along the extension line in the tracking space.

According to still another aspect of the present invention, in the data analysis device, the boundary search means acquires a height of a step top surface and a height of a step bottom surface based on a cloud of the points in areas neighboring the step neighborhood area, and acquires the directional line based on a distribution, on the horizontal plane, of points located in a height range higher than the step bottom surface and lower than the step top surface among the cloud of points belonging to the step neighborhood area.

In the present invention, the subspace setting means divides the target space into the plurality of subspaces in a rectangular parallelepiped shape, for example.

According to an aspect of the present invention, there is provided a data analysis method for detecting a step on a ground based on data of a cloud of points representing a three-dimensional shape of a feature surface in a target space subject to analysis, including: a subspace setting step of dividing the target space into a plurality of subspaces, and setting the plurality of subspaces respectively as unit spaces to be analyzed; and a boundary search step of searching for a boundary formed by the step on a horizontal plane for each of the unit spaces. The boundary search step includes searching the horizontal plane for a step neighborhood area which has a predetermined width and in which the points projected on the horizontal plane are accumulated equal to or more than a criteria set in advance and a cloud of the points have a difference in height equal to or more than a step threshold set in advance, and searching for a directional line along a distribution of the cloud of points belonging to the step neighborhood area on the horizontal plane as the boundary.

According to another aspect of the present invention, the data analysis method further includes a boundary tracking step of tracking the boundary detected in the subspace outside the subspace. The boundary tracking step includes setting, when the boundary is detected in the unit space, a new unit space neighboring the unit space, as a tracking space in a direction of an extension line of the directional line corresponding to the boundary, and the boundary search step includes searching for a boundary along the extension line in the tracking space.

According to the present invention, there is provided a program for causing a computer to perform data analysis for detecting a step on the ground based on data of a cloud of points representing a three-dimensional shape of a feature surface in a target space subject to analysis, the program causing the computer to function as: subspace setting means for dividing the target space into a plurality of subspaces, and setting the plurality of subspaces respectively as unit spaces to be analyzed; and boundary search means for searching for a boundary formed by the step on a horizontal plane for each of the unit spaces. The boundary search means searches the horizontal plane for a step neighborhood area which has a predetermined width and in which the points projected on the horizontal plane are accumulated equal to or more than a criteria set in advance and a cloud of the points have a difference in height equal to or more than a step threshold set in advance, and searches for a directional line along a distribution of the cloud of points belonging to the step neighborhood area on the horizontal plane as the boundary.

According to another aspect of the present invention, the program further causes the computer to function as boundary tracking means for tracking the boundary detected in the subspace outside the subspace. The boundary tracking means sets, when the boundary is detected in the unit space, a new unit space neighboring the unit space, as a tracking space in a direction of an extension line of the directional line corresponding to the boundary, and the boundary search means searches for a boundary along the extension line in the tracking space.

DETAILED DESCRIPTION OF THE INVENTION

A description is now given of a step on the ground extraction system 2 which is an embodiment of the present invention referring to drawings. This system is a data analysis device for detecting a step on the ground based on point cloud data representing a three-dimensional shape of a feature on the Earth's surface. The point cloud data is acquired by a laser scanner installed on a vehicle traveling on the ground as the mobile mapping system described above, for example. Moreover, the laser scanner may be installed on the ground for the measurement. It is necessary, in order to represent the three-dimensional shape of the feature surface by the point cloud data, to carry out the laser scan with enough density corresponding to the scale of surface condition (recesses and protrusions), and steps of the feature surface. Regarding this point, the laser scan carried out at such a height as a vehicle and a tripod can realize a scan density that is high enough to acquire a change in shape as small as several centimeters, such as a step on a roadside, within a road or the vicinity thereof, for example.

Figure 1:
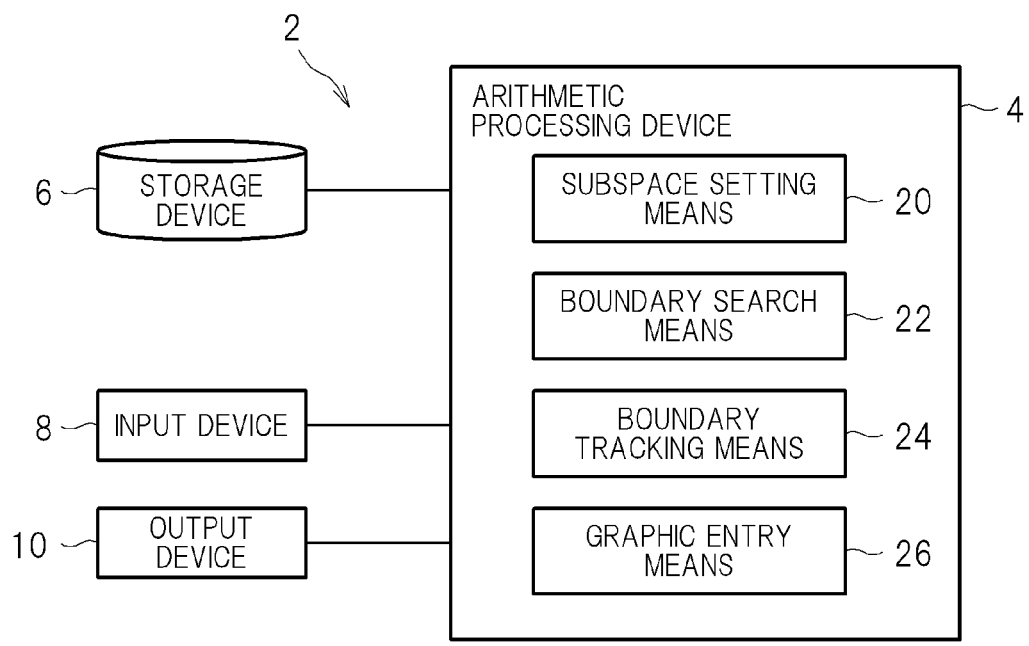
FIG. 1 is a block diagram illustrating a schematic configuration of a step on the ground extraction system according to an embodiment of the present invention.

FIG. 1 is a block diagram illustrating a configuration overview of the step on the ground extraction system 2. This system 2 includes an arithmetic processing device 4, a storage device 6, an input device 8, and an output device 10. Though dedicated hardware for carrying out various arithmetic processing of this system may be constructed as the arithmetic processing device 4, the arithmetic processing device 4 is constructed by a computer and a program executed on the computer according to this embodiment.

A central processing unit (CPU) of this computer constitutes the arithmetic processing device 4, and functions as subspace setting means 20, boundary search means 22, boundary tracking means 24, and graphic entry means 26 described later.

The storage device 6 is constituted by a hard disk or the like incorporated in the computer. The storage device 6 stores programs controlling the arithmetic processing device 4 to function as the subspace setting means 20, the boundary search means 22, the boundary tracking means 24, and the graphic entry means 26, other programs, and various data required for processing by this system. For example, the storage device 6 stores point cloud data of a space to be analyzed as processing subject data. For example, an area along a road is set as a space to be analyzed.

The input device 8 is a keyboard, a mouse, and the like, and used by a user for operating this system.

The output device 10 is a display, a printer, and the like, and is used for presenting a boundary (i.e. an edge) of a step acquired by this system to the user as a screen display, a print, and the like.

Figure 2:
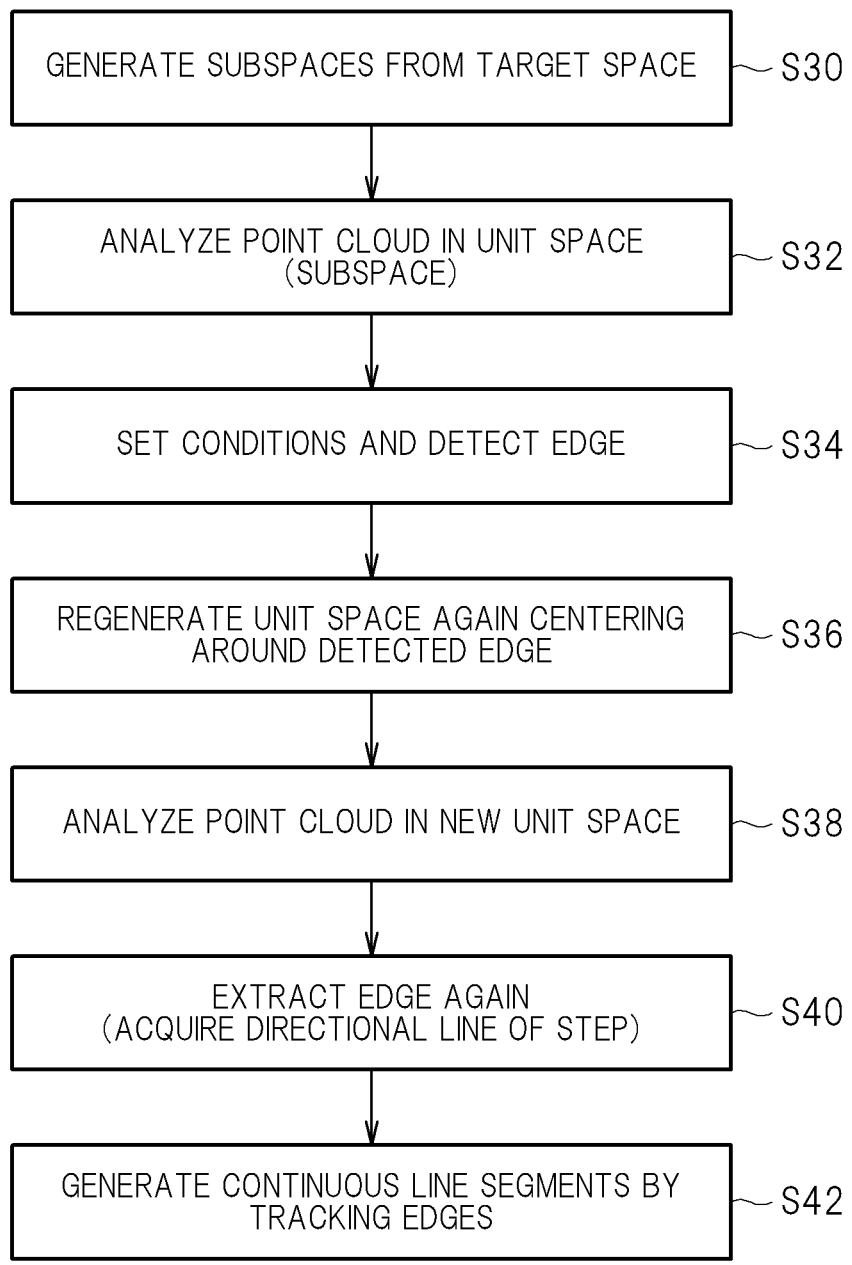
FIG. 2 is a flowchart of an overview of step extraction processing carried out by the step on the ground extraction system according to the embodiment of the present invention.

FIG. 2 is a flowchart of an overview of step extraction processing by the step on the ground extraction system 2. Referring to FIG. 2, a description is now given of the respective means of the arithmetic processing device 4.

The subspace setting means 20 divides a target space subject to analysis into a plurality of subspaces, and sets the subspaces respectively as initial unit spaces to be analyzed (S30). Though the subspaces may be set so that neighboring subspaces overlap each other, the subspace setting means 20 simply divides the target space into a three-dimensional orthogonal grid (mesh), thereby generating subspaces in a rectangular parallelepiped shape in this embodiment. For example, the subspace may have a width W: 50 cm, a depth D: 50 cm, and a height H: 60 cm. It should be noted that the width W, the depth D, and the height H are parameterized in a program constructing the subspace setting means 20, and can be changed by the user using the input device 8, for example.

The boundary search means 22 analyzes a point cloud in each of the unit spaces, and searches for a boundary formed by a step on a horizontal plane (X-Y plane in the XYZ orthogonal coordinate system) (S32, S34). The boundary search means 22 places a line serving as a candidate of the boundary (candidate line) in various ways on the X-Y plane of the unit space in the process of the search. A straight step is to be extracted according to this embodiment, and a directional line along a boundary of the step is searched for. The shape of the candidate line is also a line or a line segment corresponding to the straight step. The boundary search means 22 sets a strip area having a width set in advance along the candidate line. The strip area is set variously on the X-Y plane according to the candidate line. The boundary search means 22 searches a step neighborhood area containing a step among the strip areas. Specifically, the boundary search means 22 acquires the number of data points (cloud of points) located in the strip area, and a difference in height (difference in coordinate in the Z axis) among the data points belonging to the strip area (S32). The boundary search means 22 then extracts an edge of a step based on conditions set to the result acquired in the processing in S32 (S34). In other words, if the number of a cloud of points accumulated in the strip area is equal to or more than a criteria set in advance, and the cloud of points in the area have a difference in height equal to or more than a step threshold set in advance, the boundary search means 22 determines the area as a step neighborhood area, and determines the candidate line used for setting the step neighborhood area is determined as a boundary. It should be noted that whether or not a data point is within the strip area is determined according to the X and Y coordinates without considering the Z coordinate of the data point in the processing in S32. For example, as the criteria regarding the number of a cloud of points in the step neighborhood area, that is one of the conditions for the boundary extraction, a condition of selecting a candidate line having the maximum number of a cloud of points accumulated in the neighborhood out of the candidate lines may be set.

Moreover, if the boundary search means 22 according to this embodiment finds an edge in a subspace initially set as a unit space for the analysis, the boundary search means 22 relocates the unit space so that the edge is centered (S36). The boundary search means 22 acquires the height of a step top surface and the height of a step bottom surface based on a cloud of points in an area neighboring the step neighborhood area of the edge in the relocated unit space, and acquires a cloud of points present in a height range higher than the step bottom surface and lower than the step top surface among the cloud of points belonging to the step neighborhood area (S38). The point cloud acquired in this way is a point cloud on a step surface that rises from the step bottom surface to the step top surface, and a directional line representing the boundary of the step is acquired based on a distribution of the point cloud on the horizontal plane (S40).

The boundary search means 22 may search for only a boundary having the largest number of accumulated points in the unit space, or may carry out processing assuming multiple edges, which means that a plurality of boundaries are present in the unit space.

An edge for a straight step is to be extracted in this embodiment as described above. This is because a processing load required for the extraction of a straight line is lower than that of an arc or other shapes, and a step which needs to be extracted often has a straight edge. Moreover, the unit space is set to small with respect to a curve of a road and a center circle of a rotary intersection, and an edge of a step of these structures can be handled as a straight line within the unit space. Though the processing load increases, a configuration for searching for an edge in a predetermined shape such as an arc edge other than a straight edge can be considered in principle.

The boundary tracking means 24 tracks the boundary detected in the subspace outside the subspace (S42). If a directional line of the boundary present in the subspace serving as a starting point (starting space) is detected, the boundary tracking means 24 sets tracking spaces as new unit spaces neighboring the starting space on both extension directions of the directional line. The boundary search means 22 searches a boundary along extension lines of the directional line in the tracking space in this case. Moreover, if a boundary is detected in the tracking space, the boundary tracking means 24 further extends the directional line of the boundary in the same direction as the direction used for setting the tracking space, thereby setting a tracking space, and the boundary search means 22 searches the tracking space for a boundary. Though the unit space for the analysis set as the tracking space is a rectangular parallelepiped shape as for the subspace according to this embodiment, the dimensions thereof (W×D×H) are different from the dimensions of the subspace. For example, the height H may be determined considering the height of the step already detected in the starting space or the tracking space in which the search has been carried out in advance. Moreover, the direction and position of the boundary which is being tracked are estimated in advance, and the dimension (width W) in a direction orthogonal to the boundary may thus basically be set narrower than that of the subspace.

The graphic entry means 26 generates continuous line segments by connecting the boundaries acquired by the boundary tracking means 24 (S42), and stores the continuous line segments in the storage device 6.

Figure 3:
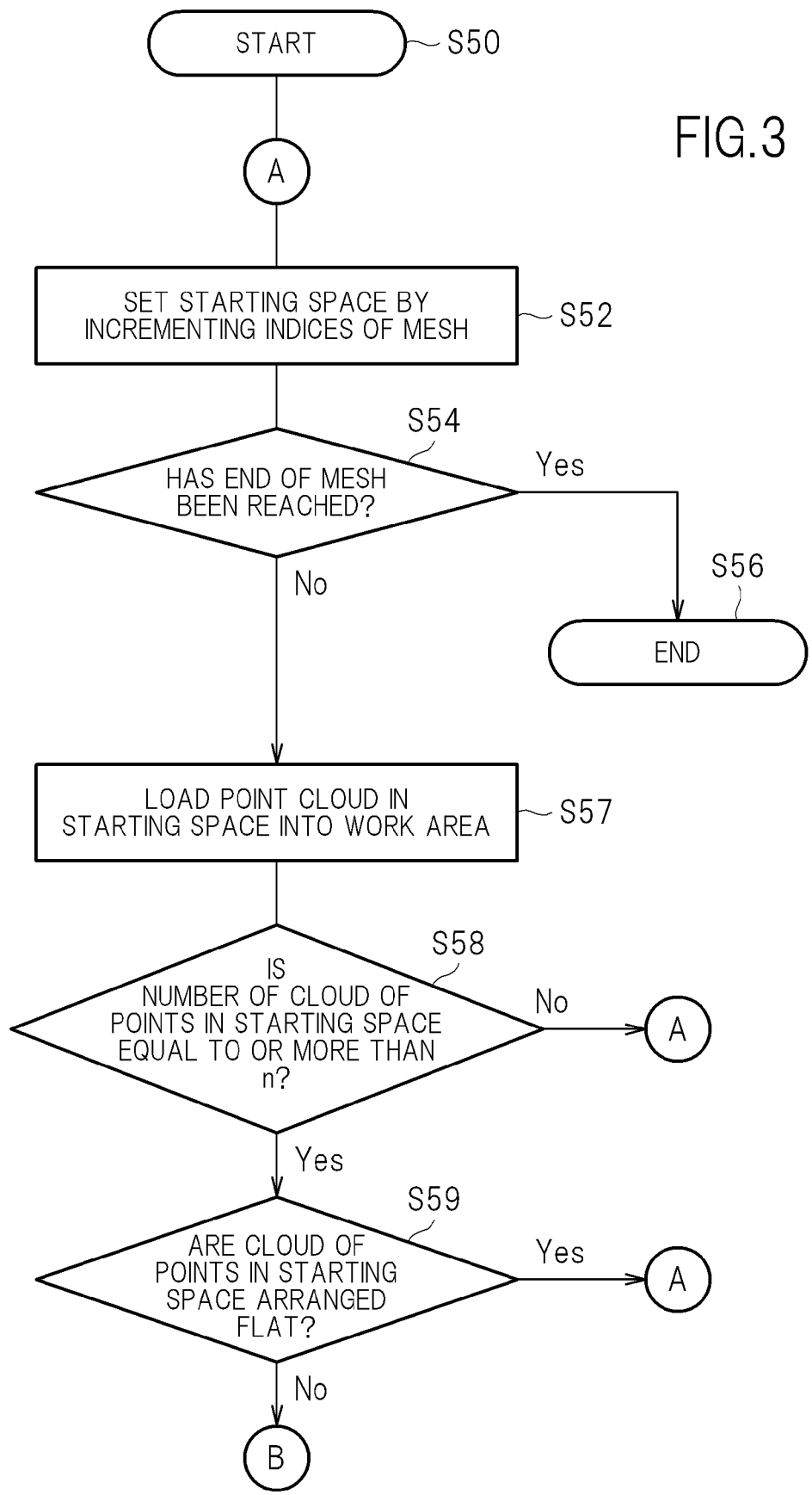
FIG. 3 is a flowchart of an overview of processing carried out by subspace setting means.

A more detailed description is now given of a processing example by the step on the ground extraction system 2. FIGS. 3, 4, and 8-10 illustrate divisions of a flow of a sequence of processing carried out by the arithmetic processing device 4, and first, FIG. 3 is a flowchart of an overview of processing carried out by the subspace setting means 20, and illustrates processing of a portion regarding the initial setting of the unit spaces for the analysis, namely the processing for generating the subspaces in the step on the ground extraction system 2. The step on the ground extraction system 2 starts the step extraction processing (S50), and the subspace setting means 20 successively generates subspaces serving as starting spaces for the tracking processing. For example, if the size of the subspace is set, the number of subspaces arranged respectively in X, Y, and Z directions are determined according to the size of the target space, and ranges of indices representing the location of the subspaces in the respective directions are determined, for example. On the other hand, if the numbers of divisions (widths of indices) in the respective directions of the target space are set, the size of the subspaces is calculated and set according to the size of the target space.

The subspace setting means 20 changes the indices representing the location of the subspace on the three-dimensional mesh in a predetermined sequence, thereby setting the subspace in the rectangular parallelepiped shape defined at a location represented by ranges of the coordinates in respective X, Y, and Z directions corresponding to the set indices as a starting space (S52). If the subspace on the mesh specified by the indices has not been processed yet ("No" in S54), the subspace setting means 20 loads a point cloud in the starting space from the storage device 6 such as a hard disk into a work area such as a random access memory (RAM) (S57). If the number of the cloud of points in the starting space is equal to or more than a threshold n ("Yes" in S58), and the cloud of points in the starting space are not arranged flat ("No" in S59), the search for a step is carried out while the subspace is considered as the starting space (processing proceeds to the node B in FIG. 4).

On the other hand, if the number of the cloud of points in the starting space is less than the threshold n ("No" in S58), and it is determined that the cloud of points in the starting space are arranged flat ("Yes" in S59), it is determined that a step is not present, or that the step search cannot be accurately carried out, and the search is not carried out. In these cases, the processing for this starting space is finished, and the subspace setting means 20 returns to the processing for setting a next subspace to the starting space (processing returns to the node A). For example, the threshold n for the cloud of points may be set to five or more for the processing in S58. Moreover, if a difference in height among the cloud of points (difference between the highest elevation and the lowest elevation) is smaller than a preset value, it is determined that the cloud of points are arranged flat in processing in S59.

If the processing has been finished for all the subspaces on the mesh ("Yes" in S54), the arithmetic processing device 4 finishes the step extraction processing (S56).

Figure 4:
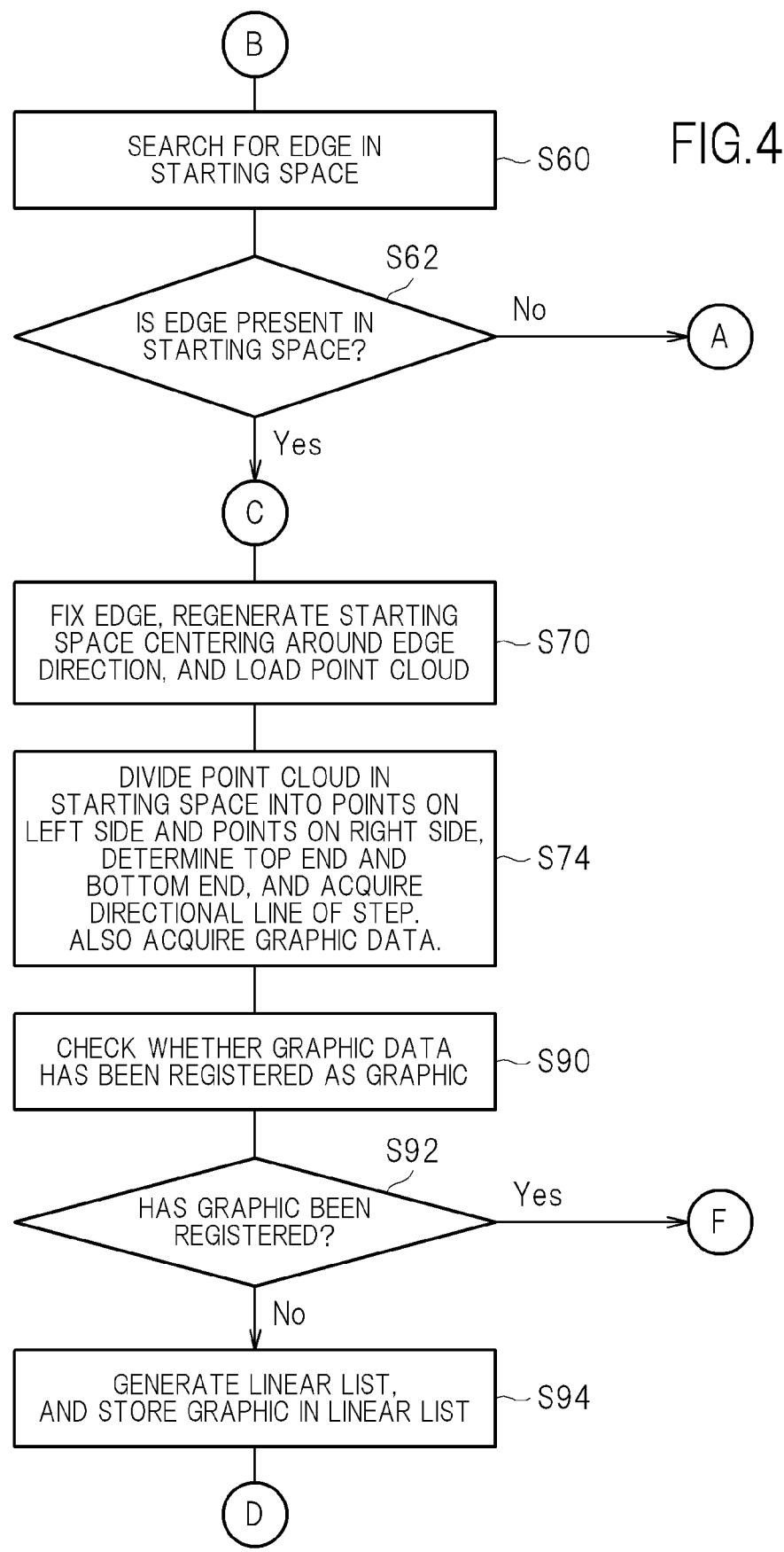
FIG. 4 is a flowchart of an overview of processing carried out by boundary search means.

FIG. 4 is a flowchart of an overview of processing carried out by the boundary search means 22, and illustrates processing regarding the search for an edge of a step in a starting space. The boundary search means 22 searches the starting space to determine whether an edge is present in the starting space (S60).

Figure 5:
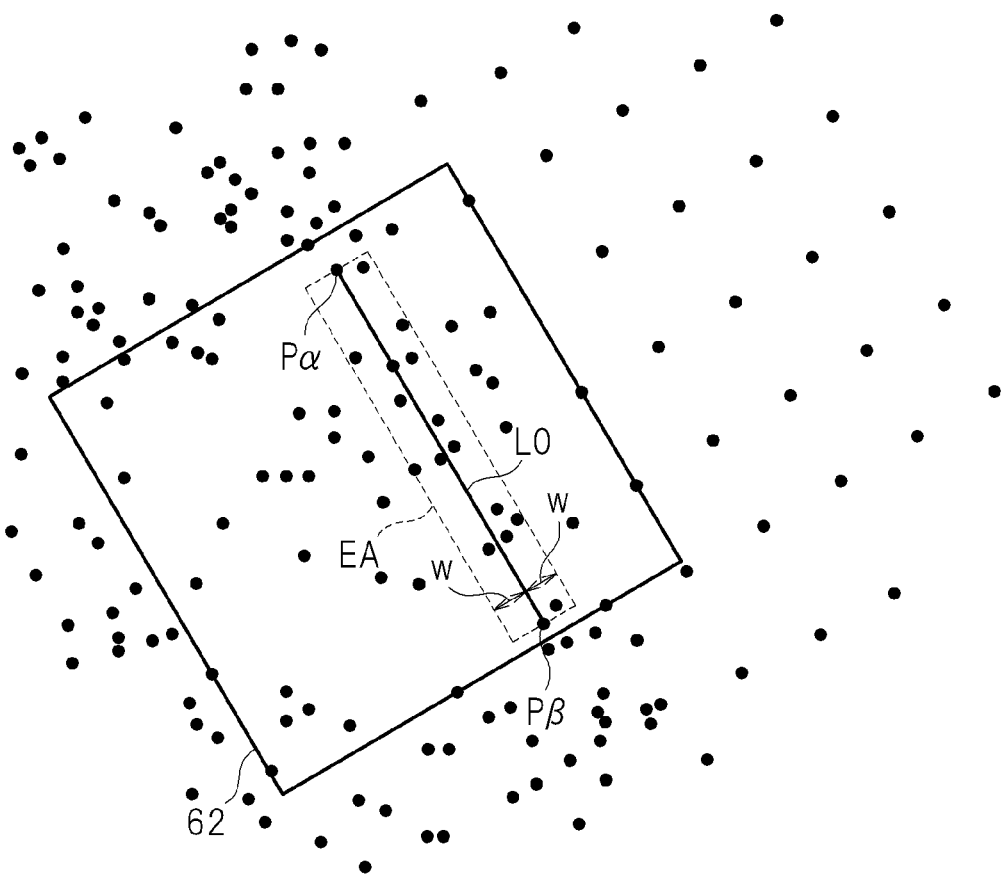
FIG. 5 is a schematic view illustrating edge search processing in a starting space.

FIG. 5 is a schematic view illustrating edge search processing in S60 in a starting space. FIG. 5 is a view of the starting space observed from above, and illustrates an example of a rectangle corresponding to a starting space 62 and an arrangement of a cloud of points in the starting space 62 on the X-Y plane. The boundary search means 22 selects two arbitrary data points Pα and Pβ from the point cloud in the starting space 62, sets a line segment L0 on the X-Y plane between the two data points Pα and Pβ as a candidate line of an edge, and sets a strip area EA having a width w on both sides of the line segment L0 (total width is 2 w). The boundary search means 22 counts the number of data points within the point cloud whose coordinates on the X-Y plane are located in the area EA. Whether or not a data point is in the area EA may be determined according to whether or not the length of a perpendicular line from the data point to the line segment L0 on the X-Y plane is equal to or less than w, for example. Moreover, the condition that a three-dimensional shape represented by the point cloud in the area EA is not flat is imposed as a condition of an edge. Specifically, the boundary search means 22 determines that the three-dimensional shape is not flat if a difference $\Delta Z$ in height (difference between the maximum elevation and the minimum elevation) among the data points contained in the area EA is equal to or more than a step threshold γ set in advance.

The boundary search means 22 makes the above-mentioned determination by setting a candidate line for all combinations of two data points selected in the starting space, and selects a line segment L0 whose area EA contains the largest number of data points, and whose $\Delta Z$ is equal to or more than the step threshold γ as an edge acquired by the search processing in the starting space. If there is an edge ("Yes" in S62), the boundary search means 22 proceeds to processing in S70. On the other hand, if an edge is not found ("No" in S62), the boundary search means 22 finishes the processing for this starting space, and proceeds to the processing for a next subspace set as the starting space (processing proceeds to the node A in FIG. 3).

At this time, the width w is a parameter, and absorbs a variation in position of data points corresponding to a step in the direction orthogonal to the edge. For example, w may be set to approximately 3 cm for extracting a step on a roadside. Moreover, the step threshold γ may be set to approximately 2 cm, for example.

Figure 6:
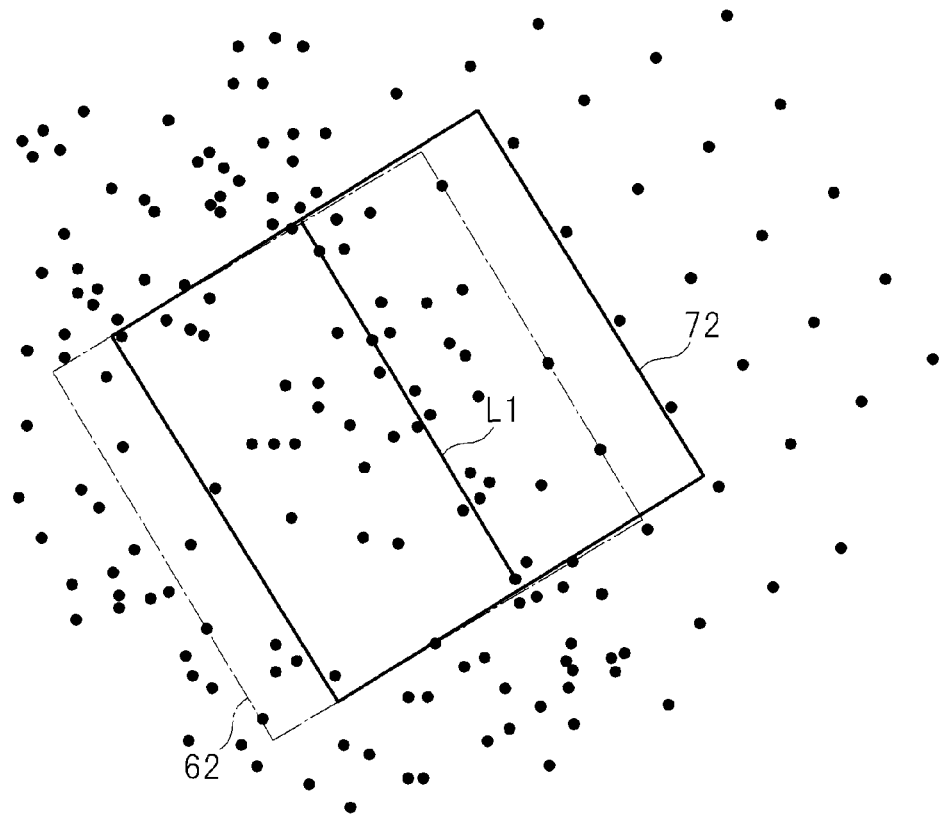
FIG. 6 is a schematic view of relocation of the starting space.

The boundary search means 22 fixes the position of the edge extracted from the starting space, regenerates a starting space so that the fixed edge L1 is centered, and loads a point cloud in the starting space from the storage device 6 into the work area (S70). FIG. 6 is a schematic view illustrating the relocation of the starting space, and is a view of the relocated starting space 72 and the edge L1 observed from above, and the initial starting space 62 is indicated by dashed-dotted lines for comparison.

Figure 7:
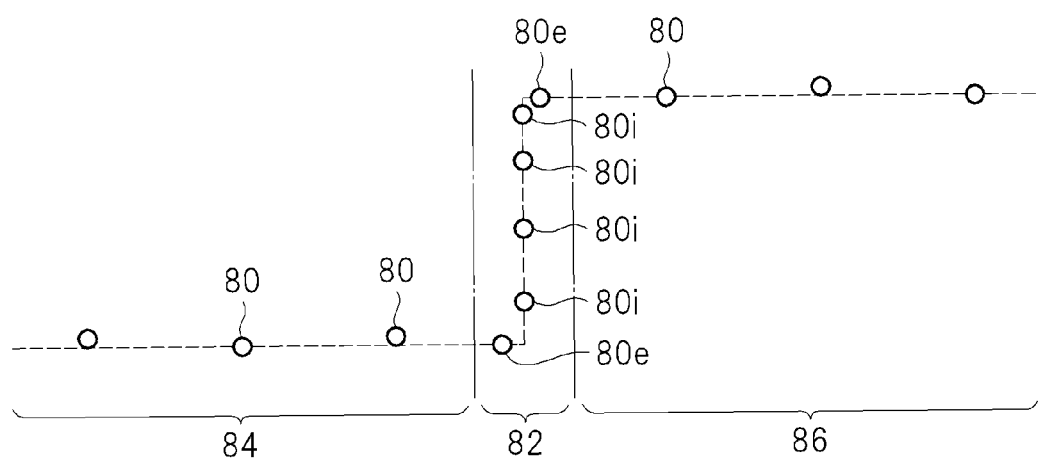
FIG. 7 is a schematic view of a vertical cross section of the starting space viewed in an edge direction.

After the edge L1 is extracted, the boundary search means 22 classifies the cloud of points in the starting space into a bottom portion of the step (bottom end), a step portion, and a top portion of the step (top end) (S74). FIG. 7 is a schematic view of a vertical cross section of the starting space viewed in an edge direction. Circles are data points 80 in FIG. 7, and a step portion 82 is located at the center in this figure, the left side is a bottom end (such as a road portion 84), and the right side is a top end (such as a side walk portion 86). Specifically, the step portion 82 is a point cloud in a step neighborhood area corresponding to the edge, and is located in the strip area having the width 2w while the edge L1 is at the center on the X-Y plane. The boundary search means 22 acquires the minimum elevation of a point cloud on both sides of the step portion 82. For example, the boundary search means 22 acquires the minimum elevation of the point cloud on the left side of the step portion 82, and the minimum elevation of the point cloud on the right side of the step portion 82 in FIG. 7, compares the minimum elevations with each other, considers the lower minimum elevation as a bottom end of the step, and defines this minimum elevation as the height $Z_L$ of the bottom end. On the other hand, the boundary search means 22 considers the higher minimum elevation as a top end of the step, and defines this minimum elevation as the height $Z_H$ of the top end. Influence of noise points and a point cloud corresponding to weeds and branches appearing above the feature surface can be eliminated by defining the heights of the bottom end and the top end of the step according to the minimum elevations in this way.

Moreover, the boundary search means 22 calculates the direction of the step from the point cloud in the step portion 82. The boundary search means 22 sets a line segment passing through two points Qα and Qβ for all combinations of two data points selected from the step portion 82, and acquires a sum of lengths of a perpendicular line between the line segment and each of the other data points of the step portion 82 in terms of a positional relationship projected on the X-Y plane. Then, the boundary search means 22 finds the minimum sum of the vertical line lengths for the combinations of the two points Qα and Qβ in the step portion 82, and defines a line segment defined by these two points as a directional line of the edge.

It should be noted that the directional line may be acquired by determining a linear expression representing the directional line of the step on the X-Y plane by means of the least squares method using all the data points in the step portion 82.

The line segment is preferably limited to a line segment located between the height of the upper end and the height of the lower end in each of the above-mentioned methods for acquiring the directional line of the step. Moreover, the step portion 82 has the width 2 W, and the data points 80 in the step portion 82 having this width include not only data points 80$i$ located on a step surface between the height of the top end and the height of the bottom end (vertical surface or sloped surface) but also data points 80$e$ located on the surface of the top end or the surface of the bottom end as illustrated in FIG. 7. In order to accurately align the directional line of the step to the step surface, it is preferred to remove the data points 80$e$ from the data points 80 (80$i$ and 80$e$) in the step portion 82 in the processing according to each of the above-mentioned methods for acquiring the directional line of a step, and to use only the remaining data points 80$i$. For example, there may be provided a configuration in which a parameter $\epsilon_Z$ (>0) is set, and in which, from among the data points 80 (80$i$ and 80$e$) in the step portion 82, data points whose Z coordinate is in a range $[Z_L+\epsilon_Z, Z_H-\epsilon_Z]$ are used as the data points 80$i$ for determining the directional line of the step. The parameter $\epsilon_Z$ can be set according to the height of the step ($Z_H-Z_L$) or the step threshold γ, and is set to a half or less of any one of them. Moreover, if all the data points 80 in the step portion 82 are 80$e$, and no data points 80$i$ remain for the set parameter $\epsilon_Z$, there may be provided a configuration in which the processing of excluding the data points 80$e$ is omitted, or a configuration in which the parameter $\epsilon_Z$ is changed so that a certain number or ratio of data points remain as data points 80$i$.

The boundary search means 22 acquires graphic data based on a result of the above-mentioned processing. For example, the boundary search means 22 acquires two intersection points at which the acquired directional line of the step intersects with sides of a rectangle which is a flat shape of the starting space 72, and defines a line connecting these intersection points with each other as a directional line. Graphic data includes an edge bottom end which is a line segment between two points in the three-dimensional space acquired by combining X and Y coordinates defining the respective intersection points and the Z coordinate given by the height $Z_L$ of the bottom end, an edge top end which is a line segment between two points in the three-dimensional space acquired by combining the X and Y coordinates defining the respective intersection points and the Z coordinate given by the height $Z_H$ of the top end, and an edge center which is a line segment between two points in the three-dimensional space acquired by combining the X and Y coordinates defining the respective intersection points and an average elevation $Z_M=(Z_L+Z_H)/2$. In other words, a simple graphic representing a framework of the step surface is acquired as graphic data.

The boundary search means 22 checks whether a directional line coincident with or intersecting with this graphic data is included in a graphic stored in the storage device 6 (S90). If a directional line is not included in the graphics stored in the storage device 6 ("No" in S92), the boundary search means 22 generates a linear list for buffering the graphic data, stores the graphic data acquired from the starting space in the linear list (S94), and starts the boundary tracking processing (proceeds to the node D in FIG. 8). On the other hand, if the graphic is included in a graphic ("Yes" in S92), the boundary search means 22 does not record the information on the step, and carries out the multiple edge processing for searching for another step in the starting space (processing proceeds to the node F in FIG. 10).

Figure 8:
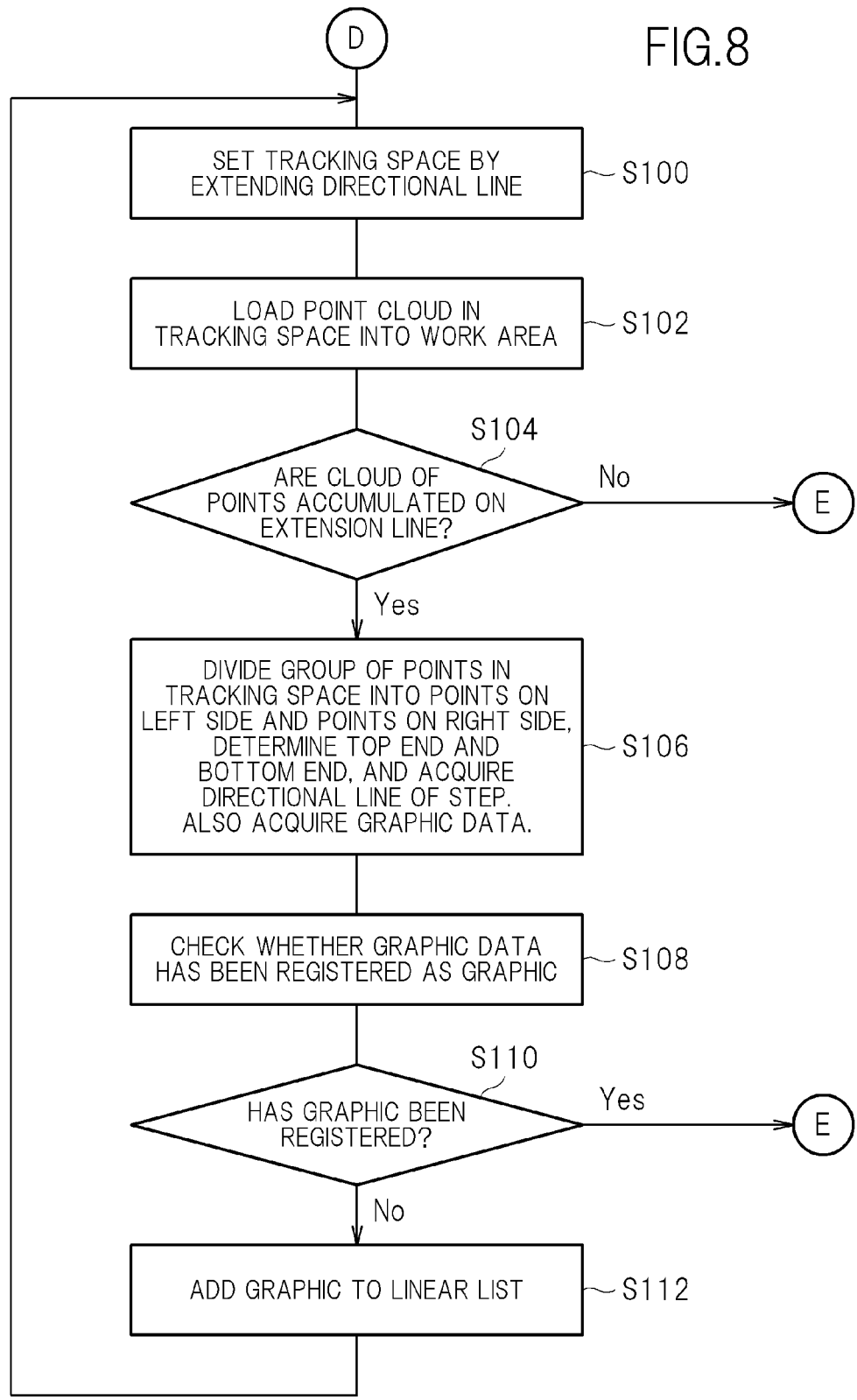
FIG. 8 is a flowchart of an overview of processing carried out by boundary tracking means.

FIG. 8 is a flowchart of an overview of processing carried out by the boundary tracking means 24, and illustrates processing regarding the search for an edge of a step in a tracking space. If an edge is detected in the starting space or a previously set tracking space, the boundary tracking means 24 sets a tracking space neighboring the unit space in which the edge detection has previously been carried out (S100). The center of the width W of the new tracking space is made coincident with an extension of the directional line of the graphic data of the preceding unit space by referring to the graphic data. As described above, the width W of the tracking space is set narrower than the width of the starting space. Moreover, regarding the height H, considering a possibility that the step has a gradient as a change in the edge direction, it is preferred that the height of the top surface be higher than the height $Z_H$ of the top end in the preceding unit space, and that the height of the bottom surface be lower than the height $Z_L$ of the bottom end in the preceding unit space. For example the height of the top surface may be $Z_H+\Delta Z$, and the height of the bottom surface may be $Z_L-\Delta Z$. The tracking is carried out respectively in two directions indicated by the directional line of the starting space. Moreover, if the boundary has been detected in the tracking space previously set, the directional line of the boundary is extended in the same direction as the direction for setting the tracking space, thereby carrying out further tracking.

After the tracking space is set, the boundary tracking means 24 loads a point cloud in the tracking space from the storage device 6 to the work area (S102), and checks whether an edge is present along the extension line of the directional line of the previous unit space. The boundary tracking means 24 determines that an edge is present along the extension line if the number of a cloud of points accumulated along the extension line in the tracking space is equal to or more than a set criteria, and the difference in height among the cloud of points is equal to or more than the step threshold γ ("Yes" in S104). In this case, the boundary tracking means 24 generates graphic data for the tracking space by carrying out processing similar to the processing in S74 by the boundary search means 22 (S106).

The boundary tracking means 24 checks whether a directional line coincident with or intersecting with this graphic data is included in the stored graphics (S108). If the directional line is not included in the stored graphics ("No" in S110), the boundary tacking means 24 adds the graphic data for the present tracking space to the linear list (S112), and the processing returns to the processing in S100, and sets a new tracking space subsequent to the present tracking space. The boundary tracking means 24 tracks an edge by successively setting a tracking space in this way.

Figure 9:
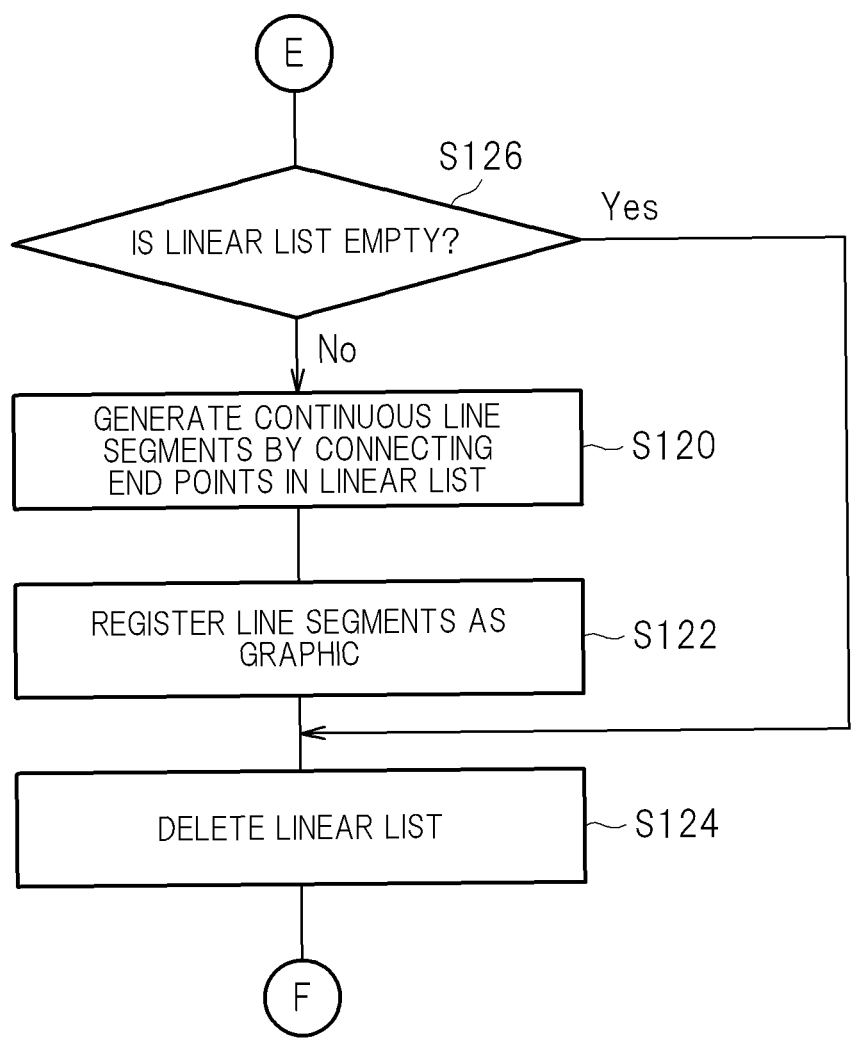
FIG. 9 is a flowchart of an overview of processing carried out by graphic entry means.

The tracking processing is carried out in the two directions as described above, and the tracking processing in a certain direction is finished if an edge is not found in a tracking space in this direction ("No" in S104), and proceeds to graphic entry processing (proceeds to the node E in FIG. 9). If the graphic data detected by means of the tracking has already been stored as the graphics in the storage device 6 ("Yes" in S110), the boundary tacking means 24 does not add the information on the step to the linear list, finishes the tracking processing, and the processing proceeds to the graphic entry processing (proceeds to the node E in FIG. 9).

FIG. 9 is a flowchart of an overview of processing carried out by the graphic entry means 26. If the bidirectional tracking processing has been finished, the graphic entry means 26 generates continuous line segments by connecting end points of the directional lines which are the graphic data stored in the linear list according to the sequence of tracking (S120). The generated continuous line segments are stored as a graphic to the storage device 6 (S122). After the graphic entry, the linear list regarding the tracking processing is no longer necessary, and is deleted (S124), and the multiple edge processing for searching for another step in the starting space is carried out (the processing proceeds to the node F in FIG. 10). If the linear list is empty (S126), the graphic entry means 26 also deletes the linear list regarding the tracking processing (S124), and the multiple edge processing for searching for another step in the starting space is carried out (the processing proceeds to the node F in FIG. 10).

Figure 10:
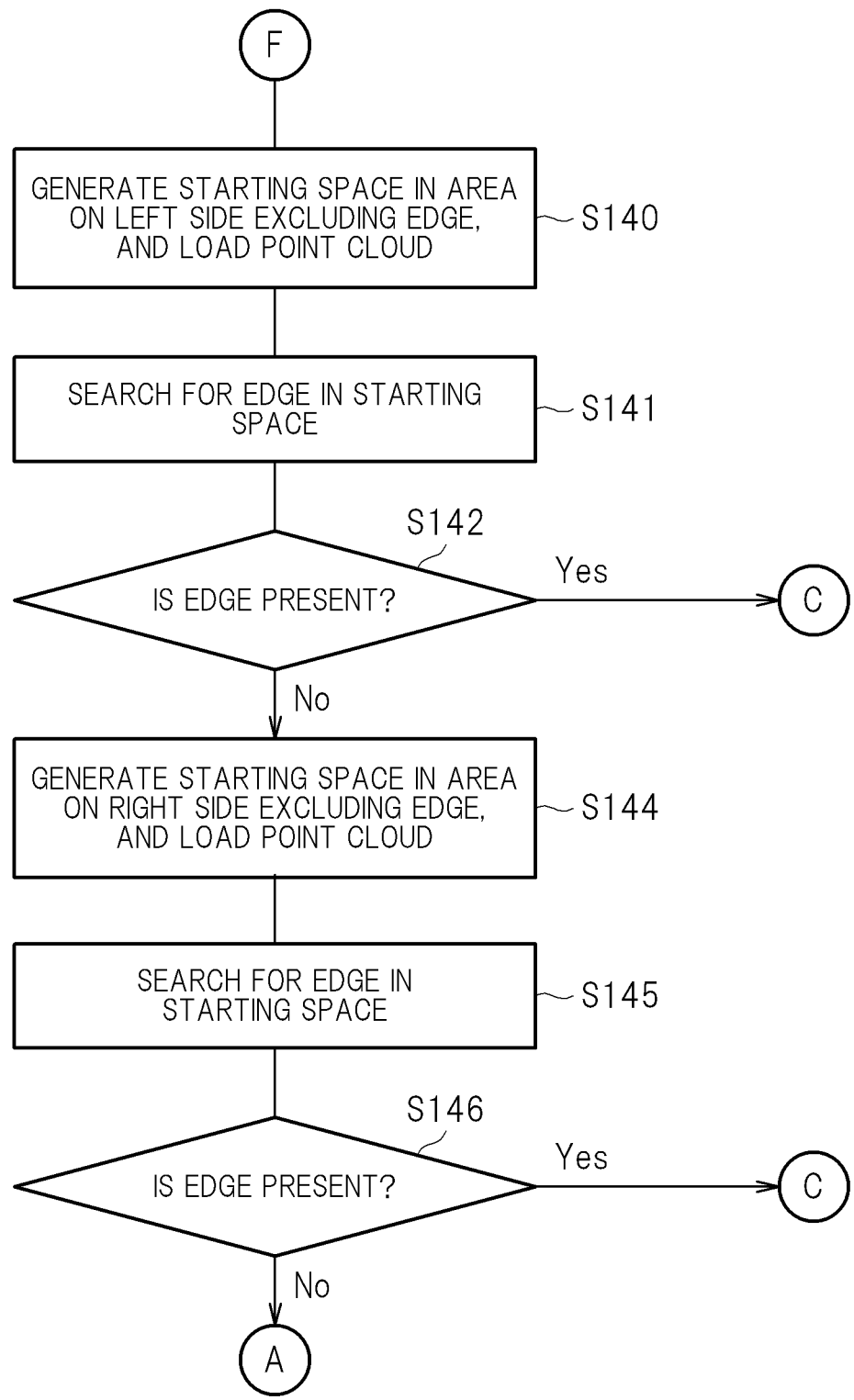
FIG. 10 is a flowchart of an overview of multiple-edge processing carried out by the boundary search means.
Figure 11A:
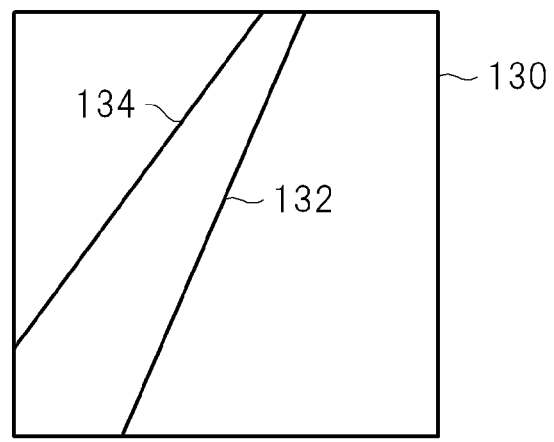
FIGS. 11A and 11B are schematic views illustrating the multiple edge processing.
Figure 11B:
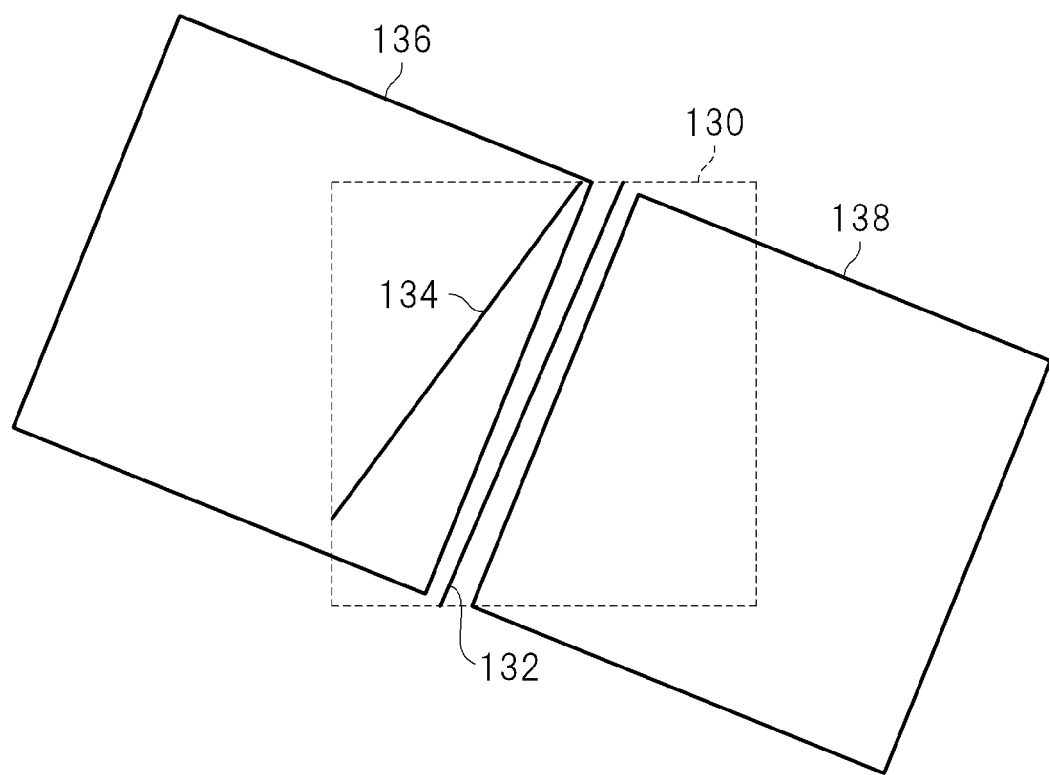

FIG. 10 is a flowchart of an overview of the multiple edge processing carried out by the boundary search means 22. If the boundary search means 22 detects an edge in a starting space, the boundary search means 22 carries out the processing such as the tracking and the graphic entry for the edge, and then carries out the multiple-edge processing of searching for other edges on both sides of this edge. FIGS. 11A and 11B are schematic views illustrating the multiple-edge processing, and illustrates a plane arrangement in the unit space. In an example illustrated in FIG. 11A, an edge 132 along which the largest number of a cloud of points accumulate, and an edge 134 along which a smaller number of a cloud of points than that of the edge 132 accumulate, are present in a starting space 130. The boundary search means 22 first detects an edge 132, carries out the processing of tracking and storing a graphic for the edge 132, and then sets new starting spaces 136 and 138 on both sides of the edge 132 so that the new starting spaces 136 and 138 do not contain the edge 132 (FIG. 11B). For example, spaces are defined on the left and right sides of the edge in any one of the directions toward which the previously detected edge (edge 132 in FIG. 11B) extends. The boundary search means 22 generates a starting space on the left side, loads a point cloud in the same way as the processing in S57, S58, and S59 (S140), searches for an edge in the starting space in the same way as the processing in S60 (S141), and determines whether an edge is present (S142). If an edge is present ("Yes" in S142), the boundary search means 22 carries out the above-mentioned processing of fixing the edge, regenerates a starting space considering the edge direction as the center, loads a point cloud in the starting space from the storage device 6 to the work area, and acquires the directional line of a step (carries out the processing starting from the node C in FIG. 4). Similarly, the boundary search means 22 generates a starting space on the right side, loads a point cloud in the same way as the processing in S57, S58, and S59 (S144), searches for an edge in the starting space in the same way as the processing in S60 (S145), and determines whether an edge is present (S146). If an edge is present ("Yes" in S146), the boundary search means 22 carries out the above-mentioned processing of fixing the edge, regenerating a starting space considering the edge direction as the center, loading a point cloud in the starting space from the storage device 6 to the work area, and acquiring the directional line of a step (carries out the processing starting from the node C in FIG. 4).

If multiple edges are not detected in any of the new starting spaces 136 and 138 ("No" in S142 and S146), the step extraction processing for a starting space set for certain indices by the processing in S52 is finished, and the processing for a starting space for next indices starts (the processing returns to the node A in FIG. 3).

Though the above-mentioned embodiment has the configuration in which the program controlling the computer to operate as the respective means of the step on the ground extraction system 2 is stored in the storage device 6, and the computer reads and executes the program, in another configuration, the program can be provided to the computer via a communication medium such as a network. In this case, the step on the ground extraction system 2 includes a communication device, and the communication device acquires the program from a network or the like, and provides the arithmetic processing device 4 with the program, or stores the program in the storage device 6. Alternatively, the program may be provided by being stored in a recording medium such as a compact disc read only memory (CD-ROM).

According to the present invention, a step on the ground can automatically be detected based on point cloud data representing a three-dimensional shape of a feature surface on the Earth's surface.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A data analysis device for detecting a step on the ground based on data of a cloud of points representing a three-dimensional shape of a feature surface in a target space subject to analysis, comprising:
   subspace setting means for dividing the target space into a plurality of subspaces, and setting the plurality of subspaces respectively as unit spaces to be analyzed; and
   boundary search means for searching for a boundary formed by the step on a horizontal plane for each of the unit spaces,
   wherein the boundary search means variously places a candidate line of the boundary on the horizontal plane in the unit space, sets a strip-shaped area having a predetermined width along the candidate line, determines the strip-shaped area in which the points projected on the horizontal plane are accumulated equal to or more than a criteria set in advance and a cloud of the points have a difference in height equal to or more than a step threshold set in advance as a step neighborhood area, and determines a directional line along a distribution of the cloud of points belonging to the step neighborhood area on the horizontal plane as the boundary.

2. The data analysis device according to claim 1, further comprising boundary tracking means for tracking the boundary detected in the subspace outside the subspace, wherein:
   the boundary tracking means sets, when the boundary is detected in the unit space, a new unit space neighboring the unit space, as a tracking space in a direction of an extension line of the directional line corresponding to the boundary; and
   the boundary search means searches for a boundary along the extension line in the tracking space.

3. The data analysis device according to claim 1, wherein the boundary search means acquires a height of a step top surface and a height of a step bottom surface based on a cloud of the points in areas neighboring the step neighborhood area, and acquires the directional line based on a distribution, on the horizontal plane, of the points located in a height range higher than the step bottom surface and lower than the step top surface among the cloud of points belonging to the step neighborhood area.

4. The data analysis device according to claim 1, wherein the subspace setting means divides the target space into the plurality of subspaces in a rectangular parallelepiped shape.

5. A data analysis method for detecting a step on the ground based on data of a cloud of points representing a three-dimensional shape of a feature surface in a target space subject to analysis, comprising:
   a subspace setting step of dividing the target space into a plurality of subspaces, and setting the plurality of subspaces respectively as unit spaces to be analyzed; and
   a boundary search step of searching for a boundary formed by the step on a horizontal plane for each of the unit spaces,
   wherein the boundary search step variously places a candidate line of the boundary on the the horizontal plane in the unit space, sets a strip-shaped area having a predetermined width along the candidate line, determines the strip-shaped area in which the points projected on the horizontal plane are accumulated up to or more than a criteria set in advance and a cloud of the points have a difference in height equal to or more than a step threshold set in advance as a step neighborhood area, and determines a directional line along a distribution of the cloud of points belonging to the step neighborhood area on the horizontal plane as the boundary.

6. The data analysis method according to claim 5, further comprising a boundary tracking step of tracking the boundary detected in the subspace outside the subspace, wherein:
   the boundary tracking step comprises setting, when the boundary is detected in the unit space, a new unit space neighboring the unit space, as a tracking space in a direction of an extension line of the directional line corresponding to the boundary; and
   the boundary search step comprises searching for a boundary along the extension line in the tracking space.

7. A non-transitory computer-readable medium storing a program causing a computer to perform data analysis for detecting a step on the ground based on data of a cloud of points representing a three-dimensional shape of a feature surface in a target space subject to analysis, the program causing the computer to function as:
   subspace setting means for dividing the target space into a plurality of subspaces, and setting the plurality of subspaces respectively as unit spaces to be analyzed; and boundary search means for searching for a boundary formed by the step on a horizontal plane for each of the unit spaces, wherein the boundary search means variously places a candidate line of the boundary on the horizontal plane in the unit space, sets a strip-shaped area having a predetermined width along the candidate line, determines the strip-shaped area in which the points projected on the horizontal plane are accumulated up to or more than a criteria set in advance and a cloud of the points have a difference in height equal to or more than a step threshold set in advance as a step neighborhood area, and determines a directional line along a distribution of the cloud of points belonging to the step neighborhood area on the horizontal plane as the boundary.

8. The non-transitory computer-readable medium according to claim 7, wherein:

the program further causes the computer to function as a boundary tracking means for tracking the boundary detected in the subspace outside the subspace;

the boundary tracking means sets, when the boundary is detected in the unit space, a new unit space neighboring the unit space, as a tracking space in a direction of an extension line of the directional line corresponding to the boundary; and the boundary search means searches for a boundary along the extension line in the tracking space.

* * * * *